(12) United States Patent
Alberternst et al.

(10) Patent No.: US 7,434,612 B2
(45) Date of Patent: Oct. 14, 2008

(54) MULTIPLE ZONED AIR CONDITIONING SYSTEM

(75) Inventors: Thomas Alberternst, Eschweiler (DE); Michael Fietz, Aachen (DE); Graham R. Johnstone, Knowle (GB); Andrew William Rowntree, Warwick (GB); Graham Kirby, Whitwell (GB)

(73) Assignee: Visteon Global Technologies, Inc., Van Buren Township, MI (US)

( * ) Notice: Subject to any disclaimer, the term of this patent is extended or adjusted under 35 U.S.C. 154(b) by 625 days.

(21) Appl. No.: 11/045,880

(22) Filed: Jan. 28, 2005

(65) Prior Publication Data

US 2005/0217295 A1    Oct. 6, 2005

(30) Foreign Application Priority Data

Jan. 28, 2004    (DE) ........................ 10 2004 004 462
Nov. 24, 2004    (DE) ........................ 10 2004 056 813

(51) Int. Cl.
*B60H 1/00*    (2006.01)

(52) U.S. Cl. ........................ 165/203; 165/42; 62/244; 454/160

(58) Field of Classification Search ................ 165/202, 165/203, 204, 42, 43, 44; 62/244; 454/160
See application file for complete search history.

(56) References Cited

U.S. PATENT DOCUMENTS

| 5,478,274 | A | * | 12/1995 | Danieau | 454/160 |
| 5,711,368 | A | * | 1/1998 | Ito et al. | 165/43 |
| 5,803,160 | A | * | 9/1998 | Danieau | 165/42 |
| 6,422,301 | B1 | * | 7/2002 | Scoccia et al. | 165/42 |
| 6,629,424 | B1 | * | 10/2003 | Araki et al. | 62/244 |
| 6,904,763 | B2 | * | 6/2005 | Araki et al. | 62/244 |
| 7,096,924 | B2 | * | 8/2006 | Araki et al. | 165/42 |
| 7,156,166 | B2 | * | 1/2007 | Bendell et al. | 165/203 |
| 2003/0042011 | A1 | | 3/2003 | Vincent | |

FOREIGN PATENT DOCUMENTS

WO    WO 2004/000589 A1    12/2003

* cited by examiner

*Primary Examiner*—Ljiljana (Lil) V Ciric
(74) *Attorney, Agent, or Firm*—Brinks Hofer Gilson & Lione

(57) ABSTRACT

A multiple zoned air conditioning system for providing air conditioning to the interior of an automotive vehicle. The air conditioning system includes a main air conditioning module with a first heat exchanger for cooling and with a second heat exchanger for heating, as well as a multiple zone module. The main air conditioning module creates, in cooperation with the multiple zone module, at least one first air flow conditioned for temperature. The multiple zone module is interchangeably disposed in the main air conditioning module, with the second heat exchanger engaging the multiple zone module so as to allow air flow therethrough, when the multiple zone module is disposed on the main air conditioning module.

12 Claims, 4 Drawing Sheets

MULTIPLE ZONED AIR CONDITIONING SYSTEM

BACKGROUND OF THE INVENTION

1. Field of the Invention

The present invention is directed to an air conditioning system for providing separate, zoned air-conditioning in different areas of the interior of a vehicle.

2. Related Technology

With a view to the rising demands for comfort placed by users on modern automotive vehicles, it has become the standard, as a matter of fact, to equip passenger cars with an air conditioning system. High demands for comfort are met by air-conditioning systems by means of which the different areas or zones of the interior of the automotive vehicle can be set to different temperatures. Air conditioning systems with separate temperature setting in the right and the left half of the passenger compartment are already available in vehicles of the lower middle class for example.

Further improvement may be achieved by air conditioning the rear zone of the passenger compartment independently of the first row of seats. Separate temperature setting in the right and the left half of this rear zone has also already been realized. Due to the very high construction expense associated hereto before with such type three or four zone air conditioning systems, these are to be found only in vehicles of the upper middle class or in the upper class.

A multiple zoned air conditioning system comprising a modular structure is known from DE 103 282 75A1. A one to four zone air conditioning system may be realized with one unitary base member by interchanging one single module. The modular structure therefore permits to equip a plurality of vehicles with one and the same base member of an air conditioning system and to then turn the air conditioning system into a one or multiple zoned air conditioning system adapted to the standard of the automotive vehicle by selecting the appropriate module. Such standardized construction translates into a profound savings in cost. The disadvantage of the air conditioning system known from DE 103 282 75A1, however, is that the partial flows of cool and warm air that are to be mixed in the multiple zone module have to cover a quite long distance and, what is more, not in a straight line, which presents considerable disadvantages in terms of fluid flow.

It is therefore the object of the present invention to indicate a multiple zoned air conditioning system that is simpler in design and still more efficient.

SUMMARY

The multiple zoned air conditioning system of the invention includes a main conditioning module with a first and a second heat exchanger. The first heat exchanger may thereby, for example, be connected to a refrigerant circuit of the vehicle and the second heat exchanger, with a coolant circuit of the automotive vehicle's drive system. The first heat exchanger serves to cool down to a defined temperature incoming ambient air and to dry it as needed. The second heat exchanger serves to heat the air that has been cooled down to low temperature and dried by the first heat exchanger.

Moreover, the multiple zoned air conditioning system of the invention includes a multiple zoned module that is interchangeably disposed on the main air conditioning module. The main air conditioning module is designed to create, in cooperation with the multiple zone module, at least one air flow that may be conditioned with regard to temperature so as to conform to the wishes of the passenger. However, the main air conditioning system may also be designed to create a plurality, more specifically two, independently air conditionable air flows for providing air conditioning to a plurality of separate zones of the interior of the vehicle. As used herein, cooperation between main air conditioning module and multiple zone module means that the main air conditioning module cannot be operated in accordance with its purpose of utilization without the multiple zone module.

In accordance with the invention, the multiple zone module is configured in such a manner that, if the multiple zone module is disposed on the main air conditioning module, the second heat exchanger, which is part of the main air conditioning module, engages the multiple zone module so that the air may flow therethrough. More specifically, the main air conditioning module and the multiple zone module can be configured in such a manner that a first flow path (provided in addition to the flow path already formed within the air conditioning module) forms if the multiple zone module is disposed on the main air conditioning module. Advantageously, the main air conditioning module and the multiple zone module are now configured in such a manner that at least the second heat exchanger engages into said first flow path so that the air may flow therethrough.

This makes it possible to operate but one second heat exchanger (provided for heating a supplied partial air flow) even if a genuine multiple zoned air conditioning system providing the possibility of independently air conditioning the front seat row area and the rear area is being realized. The structure of the air conditioning system of the invention is thus considerably simplified as compared to the generic air conditioning system known from prior art.

In a particularly advantageous developed implementation of the air conditioning system of the invention, both the main air conditioning module and the multiple zone module are configured in such a manner that, if the multiple zone module is disposed on the main air conditioning module, a first flow path forms, which passes within the main air conditioning module, and a second flow path forms which passes within the multiple zone module. In terms of fluid flow, particular advantages are obtained if the second heat exchanger engages both the first and the second flow path so that the air may flow therethrough.

This implementation of the first and of the second flow path in accordance with the invention permits to provide, with but one second heat exchanger (suited for example for heating), an additional air-conditioned (e.g., warm) partial air flow in addition to the cool partial air flow generated by the first heat exchanger. Said partial air flows may be used for controlled mixing in mixing chambers provided both in the main air conditioning module and in the multiple zone module. If, in addition to the first mixing chamber formed in the main air conditioning module, another mixing chamber is provided in the multiple zone module for mixing air conditioned cool and warm partial air flows, the flow paths of the air-conditioned partial air flows into said second mixing chamber may be kept extremely short and with few windings thanks to the configuration of the main air conditioning module and of the multiple zone module in accordance with the invention, so that considerable advantages in terms of fluid flow are obtained.

As a result, the air conditioning system of the invention permits to realize an adequate single to four zone air conditioning system with but one first and one second heat exchanger. The modular structure permits in the simplest manner to adapt the air conditioning system to the standard required for the automotive vehicle. In spite of the simple construction of the two modules, short flow paths with but few windings may be realized for the partial air flows to be mixed by common use of the first and the second heat exchanger both in the main air conditioning module and in the multiple zone module, which results in advantages in terms of fluid flow, more specifically in a low internal flow resistance and low noise level. These advantages are more specifically based on the fact that, as contrasted with the air conditioning system previously know from DE 103 282 75 A1, only a cool air flow is supplied to the multiple zone module. It is only within the multiple zone module that a cool and a warm partial air flow are generated for controlled mixing.

In a particularly advantageous developed implementation of the multiple zoned air conditioning system the multiple zone module is designed to create, in cooperation with the main air conditioning module, at least one additional air conditionable air flow. More specifically, the multiple zone module may also be simply configured to create two additional independently air conditionable air flows for conditioning the air in two additional zones of the vehicle interior.

In a particularly preferred implementation, the main air conditioning module of the multiple zoned air conditioning system of the invention is designed to create two independently air conditionable air flows for separate air conditioning of the right and of the left front seat of the automotive vehicle. This may be realized for example by inserting a central partition wall into the multiple zone module so that the mixing chamber formed in the main conditioning module is divided into two halves that are functionally independent from each other with the number of air inlet and outlet ports being doubled. Servo flaps, which may be provided inside or outside of the mixing chamber, can then be mounted onto shafts which, although coaxially aligned, are separately drivable.

In this manner, the structure of the single zone air conditioning module and of the dual main air conditioning module (e.g., for the first row of seats) and of the single zone multiple zone module and of the dual zone multiple zone module (e.g., for the rear zone) may be largely uniformed. For the single zone module, the central partition wall is simply excluded and the servo flaps are disposed on common shafts.

The multiple zone module may be configured to create an air flow that is adapted to be air conditioned independently of the air conditionable air flows created by the main air conditioning module for separately conditioning the air in an additional zone of the vehicle interior, in the rear zone for example. Further, the multiple zone module can also be designed to create two air flows that are adapted to be air conditioned independently of one another and of the main air conditioning module, though, for example for providing separate air conditioning to the right and to the left half of the rear zone of the vehicle interior. In this case as well, this enlarged functionality can be realized as described herein above by inserting a central partition wall into the multiple zone module.

It is particularly advantageous if each of the air flows are adapted to be independently air conditioned in conformity with the present invention indeed consists of two partial flows that are not adapted to be air conditioned independently of one another, but only to be commonly air conditioned. This means for example that there are two partial flows having different temperatures, the temperature difference or the relationship between the temperatures, the temperature difference or the relationship between the temperatures being substantially constant. The temperature and/or the intensity of the partial flows may then be commonly adjusted i.e., the partial flows may be commonly air conditioned. This may for example be realized by a particular design of the mixing chamber in which the air flow adapted to be commonly air conditioned are created.

In simplified embodiments of the air conditioning system of the invention the multiple zone module is configured so as to direct at least one of the air conditionable air flows provided by the main air conditioning module to the rear zone of the vehicle interior without subjecting it to further air conditioning processes.

Both the main air conditioning module and the multiple zone module generally comprise their own mixing chambers, at any rate if they are designed to create at least one independently air conditionable air flow each. In said chambers, the independently air conditionable air flows are produced by mixing the warm and cool partial air flows in a controlled manner. To mix the warm and cool partial air flows in the mixing chambers in a controlled manner, various concepts in fluid dynamics are provided. Particular advantages are obtained if the concept in fluid dynamics respectively used is individually adjusted to the flow conditions within the main air conditioning module and within the multiple zone module respectively, or to the space available there. It may thereby be particularly advantageous to mix the hot and cool partial air flows in the mixing chamber of the main air conditioning module according to a principle in fluid dynamics different from that in the mixing chamber of the multiple zone module. The various concepts in fluid dynamics available will still be discussed in closer detail in the description of the exemplary embodiments.

The present invention is further directed to an air conditioning system consisting of both a multiple zoned air conditioning system and a plurality of interchangeable multiple zone modules. By providing such an air conditioning system, a manufacturer of original equipment for automotive vehicles will be able to meet in the simplest manner the client's various requirements using one and the same air conditioning base member, viz., the main air conditioning module, and a uniformed control logic unit. The manufacturer of the air conditioning system may thus realize enormous benefits of cost which may be passed on to the automotive vehicle manufacturer and finally to the end user.

BRIEF DESCRIPTION OF THE DRAWINGS

Further advantages and features of the multiple zoned air conditioning system of the invention and the air conditioning system configuration of the invention will become apparent from the subordinate claims and from the following non-restrictive description of embodiments, given by way of example only with reference to the drawings. The Figures show:

DETAILED DESCRIPTION

Figure 1A:
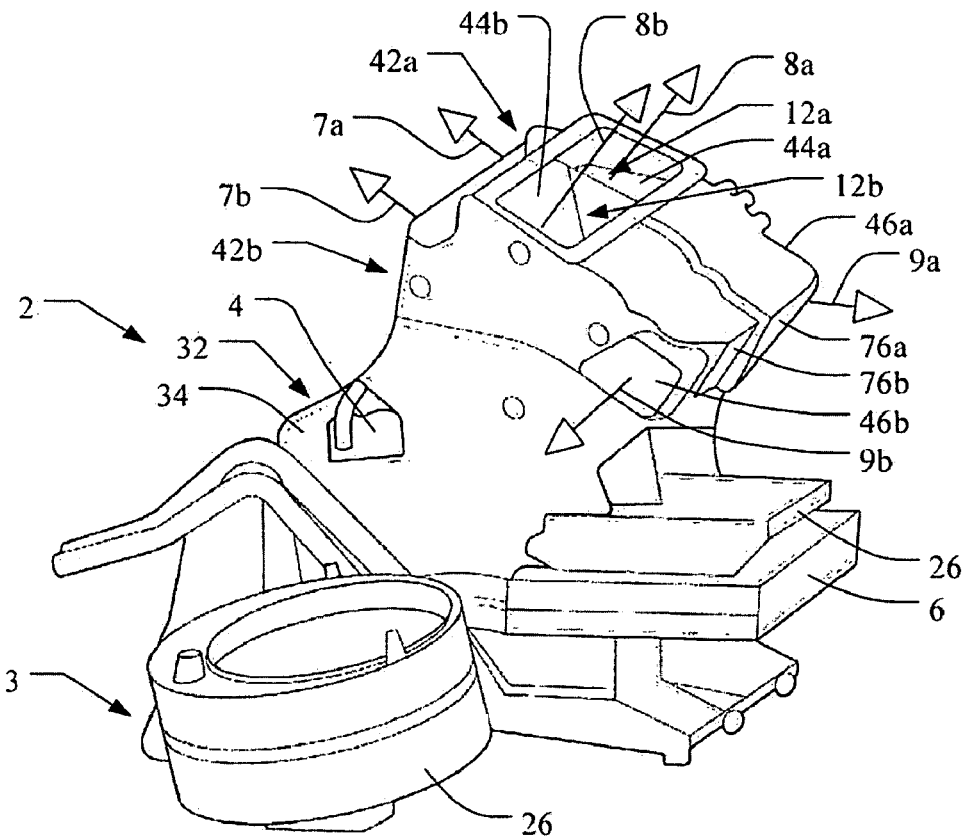
FIG. 1a is a perspective view of the main air conditioning module of a multiple zoned air conditioning system of the invention.
Figures 1B, 1C:
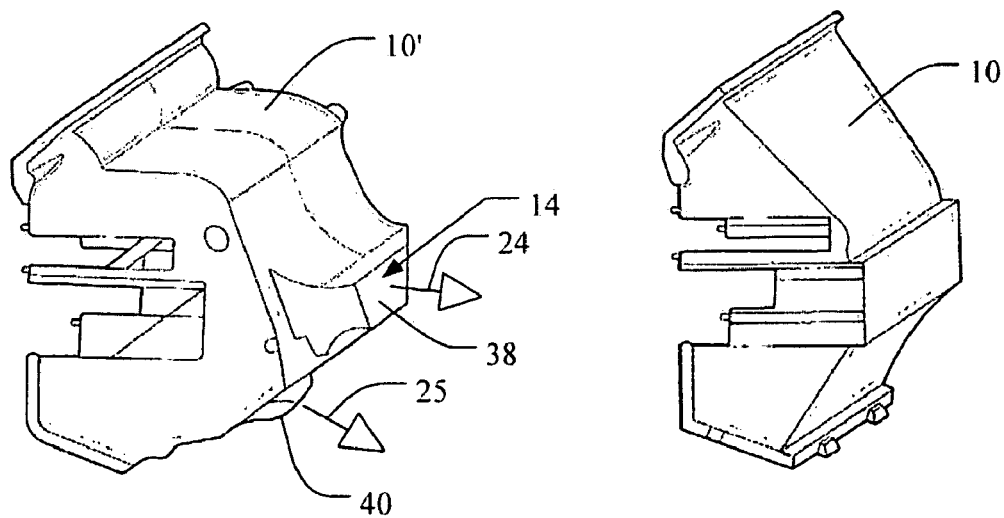
FIG. 1b is a perspective view of a first multiple zone module of a multiple zoned air conditioning system of the invention.
FIG. 1c is a perspective illustration of a second multiple zone module.

The FIGS. 1a, 1b and 1c taken together show an air conditioning system configuration in accordance with the invention. FIG. 1a thereby shows the main air conditioning module 2 of a multiple zoned air conditioning system 1 (see FIG. 2) of the invention, with FIGS. 1b and 1c illustrating a first multiple zone module 10' and a second multiple zone 10 for use with the main air conditioning module 2 shown.

The air conditioning system 1 in accordance with this exemplary embodiment is divided into various modules that are readily interchangeable and are tightly connected together when the air conditioning system 1 is operable. The air conditioning system 1 comprises a main air conditioning module 2 with a base member 34. On the inlet side, an air supply module 3, in which a fan 26 is disposed, is connected to the base member 34. The fan 26 serves to take ambient air in. The base member 34 of the main air conditioning module 2 and the air supply module 3 are configured in such a manner that the air supply module 26 may alternatively be disposed on the right or on the left side of the main air conditioning module 2 (as viewed in the direction of travel of the automotive vehicle). The multiple zone air conditioning system 1 of the invention is thus suited to being mounted both in right hand drive and in left had drive automotive vehicles. The ambient air taken from by the fan 26 into the air supply module 3 is directed through an (optional) filter 32 (not shown in FIG. 1a, but seen in FIG. 2) disposed in the air supply module into the interior of the base member 34 of the main air conditioning module 2.

Figure 2:
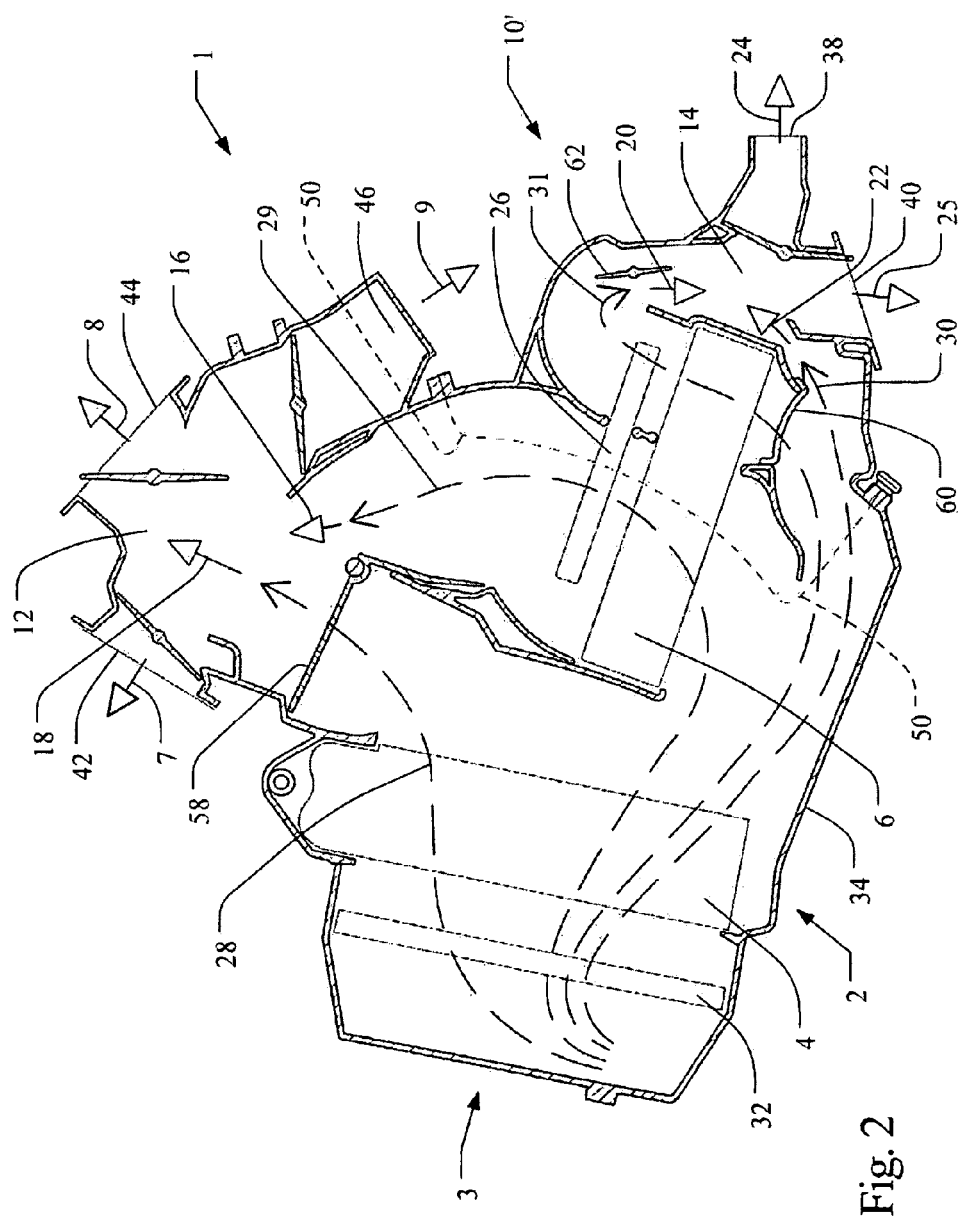
FIG. 2 is a sectional view of a multiple zoned air conditioning system of the invention with the first zone module mounted to the main air conditioning module.

In the base member 34 of the main air conditioning module 2 there are disposed a first heat exchanger 4, as seen in FIG. 2, and a second heat exchanger 6. The entire ambient air taken by the fan 26 is supplied to the first heat exchanger 4. The first heat exchanger 4 serves to cool down and dry the ambient air that has been taken in. It is connected to a refrigerant circuit of the automotive vehicle. The condensed refrigerant supplied by a refrigerant pump is vaporized in the first heat exchanger 4 to generate cool. Typically, the ambient air intake was cooled down to a temperature of about 4° C.

A second heat exchanger 6 serves to heat a portion of the air that has been cooled down and dried by the first heat exchanger 4. For this purpose, the second heat exchanger 6 is, for example, connected to the coolant circuit of the automotive vehicle drive unit. When the drive unit is operative, the coolant is heated by the heat loss of the drive unit to an increased temperature which typically is on the order of 100° C. A further heating element 26 may additionally be disposed on the main air conditioning module 2, this heating element being electrically operated (PTC) in the exemplary embodiment shown and serving as an additional heater in the starting phase of the drive unit, at low ambient temperatures or with highly efficient drive units generating (too) little heat loss.

As a direct result of the shape of the main air conditioning module 2 and of the multiple zone modules 10 and 10', the multiple zone modules 10 and 10' respectively can be disposed singly on the main air conditioning module 2. By disposing a respective one of the multiple zone modules 10 and 10', the multiple zoned air conditioning system 1 of the invention is made operative. FIG. 1b here shows a first multiple zone module 10' that is designed to create two air flows 24, 25 of differing temperatures for unitarily supplying the entire rear zone of an automotive vehicle. On the multiple zone module 10' there is formed a panel outlet 38 at which a cool air flow 24 for supplying the upper region of the rear zone is provided as well as a leg space outlet 40 at which a warm air flow 25 for supplying the leg space of the rear zone is provided.

FIG. 1c, by contrast, shows a second multiple zone module 10 that is not designed to create an independently air-conditionable air flow. The second multiple zone module 10 that can be seen from FIG. 1c rather serves to primarily cover the mounting aperture for the multiple zone modules 10, 10' formed on the main air conditioning module 2 in such a manner that the air is caused to efficiently flow through the second heat exchanger 6 on the entire heat exchange surface thereof. The second multiple zone module 10' therefore in particular comprises a strong flow directing function.

FIG. 2 shows a sectional view, in the plane of symmetry of the main air conditioning module 2 of the air conditioning system 1, of a multiple zoned air conditioning system 1 according to the FIGS. 1a and 1b. In the mounted position in the automotive vehicle, this plane of symmetry is generally oriented in the direction of travel and in the vertical direction as well. For simplicity's sake, it is assumed in the remainder of this discussion that the main air conditioning module 2 is designed for single supply of the left and the right front seats. Accordingly, the main air conditioning module 2 differs from the embodiment shown in FIG. 1a which is designed to individually air-condition the respective one of the left and the right front seats.

The ambient air taken by fan 26 passes through an air filter 32 before it enters the base member 34 of the main air conditioning module 2. The first heat exchanger 4, in which a liquefied refrigerant is vaporized, is disposed directly behind the filter 32. The thus generated cold serves to cool down to a defined initial temperature of e.g., 4° C. the ambient air that has been taken in and to remove by condensation the humidity contained therein.

Upon passage through the first heat exchanger 4, the cooled dried air is divided into a plurality of flow paths as shown by the discontinuous line in FIG. 2. A first flow path 29 leads a first portion of the air flow exiting the first heat exchanger 4 through the second heat exchanger 6 disposed within the base member 34 and through the electric heating element 26 disposed downstream thereof. The second heat exchanger 6 is connected to the coolant circuit of the automotive vehicle drive unit. The coolant circulating therein has a quite high temperature of typically about 100° C. The electric heating element 26, which is mounted downstream thereof and which is optional, may be additionally connected if the heat demand in the air conditioning system can no longer be met by the heat loss of the automotive vehicle drive unit. This condition may for example occur in the warm-up phase of the drive unit. An additional heating element 26 may, however, also be permanently necessary given the operable automotive vehicle drive unit is highly efficient and, as a result thereof, comprises a low heat loss rate. An example thereof is the modern common rail diesel engine.

The branched first partial air flow warms up as it passes via the first flow path 29 through the second heat exchanger 6 and through the optional heating element 26 and enters thereafter, from the bottom, as the first warm partial air flow 16 into the first mixing chamber 12 of the multiple zoned air conditioning system 1 of the invention, which is disposed in the main air conditioning module 2.

On a second flow path 31, a second, initially cool partial air flow also passes through the second heat exchanger 6 and through the optional heating element 26, the second flow path 31 being separated from the first flow path 39 by barriers. On the second flow path 31, a second warm partial air flow 20 is created which enters a second mixing chamber 14 disposed in the multiple zone module 10' from the top.

A third flow path 28, which again is separated from the first flow path 29 by barriers, leads a first cool partial air flow 18 into the first mixing chamber 12 from the bottom. The mix ratio between the first warm partial air flow 16 and the first cool partial airflow 18 is adjusted by means of an angled mixing valve 58.

On a fourth flow path 30, a last cool partial air flow is finally conducted from the first heat exchanger 4 to the second mixing chamber 14, which it enters from the side, as the second cool partial air flow 22. The mix ratio of the second warm partial air flow 20 and the second cool partial air flow 22 is adjusted by means of an adjustable mixing valve 60.

The multiple zoned air conditioning system of the invention having a main air conditioning module 2 and a multiple zone module 10' is thereby made operative by inserting the multiple zone module 10' into the base member 34 of the main air conditioning module 2, the two modules being jointed together. The junction 50 where the base member 34 of the main air conditioning module 2 is connected to the multiple zone module 10' forming on the superimposed joint surfaces of the two modules is shown by a dash-dot line in FIG. 2. The connection between the main air conditioning module 2 and the multiple zone module 10' is thereby configured to be overpressure proof. Once the multiple zone module 10' is inserted into the main air conditioning module 2, it is preferably secured in place on the main air conditioning module 2 by screwing. The multiple zone module 10' is thereby configured such that the first flow path 29 described herein above, which leads into the first mixing chamber 12 disposed in the main air conditioning module 2, does not form until the multiple zone module 10' is disposed on the main air conditioning module 2. Further, the second flow path 31, which extends through the main air conditioning module 2 and the multiple zone module 10', does not form until the multiple zone module 10' is disposed on the main air conditioning module 2.

Both the first flow path 29 and the second flow path 31 extend through the second heat exchanger 6 and through the optional heating element 26. In this manner, a space-saving configuration of the multiple zoned air conditioning system may be realized. Substantial constructional features may be realized by having the multiple zone module 10' and the main air conditioning module 2 share both the second heat exchanger 6 and the optional heating element 26 and by having both the first flow path 29 leading to the first mixing chamber 12 of the main air conditioning module 2 and the second flow path 31 leading to the second mixing chamber of the multiple zone module 10' passing through one and the same second heat exchanger 6 and through one and the same additional heating element 26. The multiple zone module 10' may thus dispense with an additional (second) heat exchanger or with a second optional heating element. This allows a particularly compact construction of the multiple zoned air conditioning system of the invention.

The first mixing chamber 12, which is formed in the main air conditioning module 2, functions in the same way as the often realized mixing chambers formed in prior art air conditioning systems. The concept behind the mixer in accordance with the present invention is termed a "stratified air flow mixer". The first warm partial air flow 16 and the first cool partial air flow 18 are supplied to the first mixing chamber 12 from the bottom. In the first mixing chamber 12, the first and the second partial air flow 16, 18 are mixed in such a manner that a shear layer with a fixed temperature profile forms in the vertical direction within the first mixing chamber 12. This means that, depending on the location of the outlet, an air-conditionable air flow 8, 9 exits the first mixing chamber 12 the temperature of which depends on the exact position of the outlet in the vertical direction. This principle of construction is regularly made use of in prior art. It permits to create a plurality of air-conditionable air flows of different temperatures using one mixing chamber supplied with one warm and one cool partial air flow. As a rule however, the air flows of different temperatures thus created will not be adapted to be air-conditioned independently of one another. Usually, there is rather a temperature difference between the created air-conditionable air flows. By the appropriate design of the air conditioning system this difference may be kept constant over the widest possible temperature and ventilation range.

In the case of the present multiple zoned air conditioning system 1, three outlets 42, 44 and 46 are provided in the region of the first mixing chamber 12. In the upper region of the mixing chamber 12 there is disposed a defrost outlet 42 and a front panel outlet 44. Air-conditionable air flows 7 and 8 of slightly different temperatures exit the defrost outlet 42 and the front panel outlet 44.

A front leg space outlet 46 through which much warmer air is caused to exit the first mixing chamber 12 is disposed much lower in the vertical direction in the first mixing chamber 12. In this manner, (cooler) first air-conditionable air flows 7 and 8 exiting the outlets 42 and 44 and one (warmer) second air-conditionable air flow 9 exiting the leg space outlet 46 are created using but one first mixing chamber 12. The absolute and relative intensity of the air flows 8 and 9 exiting the outlets 42, 44 and 46 is controlled by means of the fan 26 and of mixing valves which are disposed in the region of the outlets. The mixing valves, the first mixing chamber 12 and possibly the control unit of the air conditioning system are advantageously designed such that intensity and temperature of the air flows 7, 8 and 9 exiting the outlets 42, 44 and 46 hardly change upon adjustment of but one single mixing valve.

By contrast, the second mixing chamber 14, which is formed in the multiple zone module 10', is based on a new fluid mechanical mixer concept, said concept being termed herein a "crossflow mixer". As can be seen from FIG. 2, the second warm partial air flow 20 of the second mixing chamber 14 is supplied from the top. The also supplied second cool partial air flow 22 however is supplied to the second mixing chamber 14 from the side. As a result, the flow paths 70, 72 of the warm and the cool partial air flows 20, 22 intersect in the second mixing chamber 14 at an angle of about 135°. More specifically, the two partial air flows are partially caused to run counterflow in the forming mixing zone 66. With regard to the "crossflow mixer" concept of the invention, this counterflow pattern may have a positive effect in certain cases. However the crossflow mixer is not limited to such a flow pattern. It may instead be advantageously realized over a wide range of angles of intersection that may readily extend from 35° to 155°. By optimizing, in terms of fluid flow, the second mixing chamber 14 and in particular the chimney 68 provided there that will be discussed in further detail herein after, this angular range may still be widened if necessary.

A leg space outlet 40 of mixing chamber 14 provided to supply the leg space in the rear zone with a warmer air-conditionable air flow 25 is disposed opposite the entrance site where the warm partial air flow 20 enters the second mixing chamber 14. The leg space outlet 40 for the rear zone is thereby disposed substantially underneath the second mixing chamber 14. A panel outlet 38 for the rear zone is disposed laterally from the second mixing chamber opposite the entrance site of the second cool partial air flow 22, though. A second air-conditionable air flow 24, which is slightly cooler than the one exiting the leg space outlet 40, exits said panel outlet 38. The precise ratio between the temperatures of the air-conditionable air flows 24 and 25 can be adjusted by the mix ratios in the "crossflow mixer". These mix ratios are substantially determined by the properties of the second mixing chamber 14 in terms of fluid mechanics. This is the reason why the air flows 24 and 25 are not adapted to be air-conditioned independently from one another with regard to temperature. The relative intensity of the air flows 24 and 25 exiting the ports 38 and 40 can be varied by means of another angled mixing valve 64, though.

Figure 3:
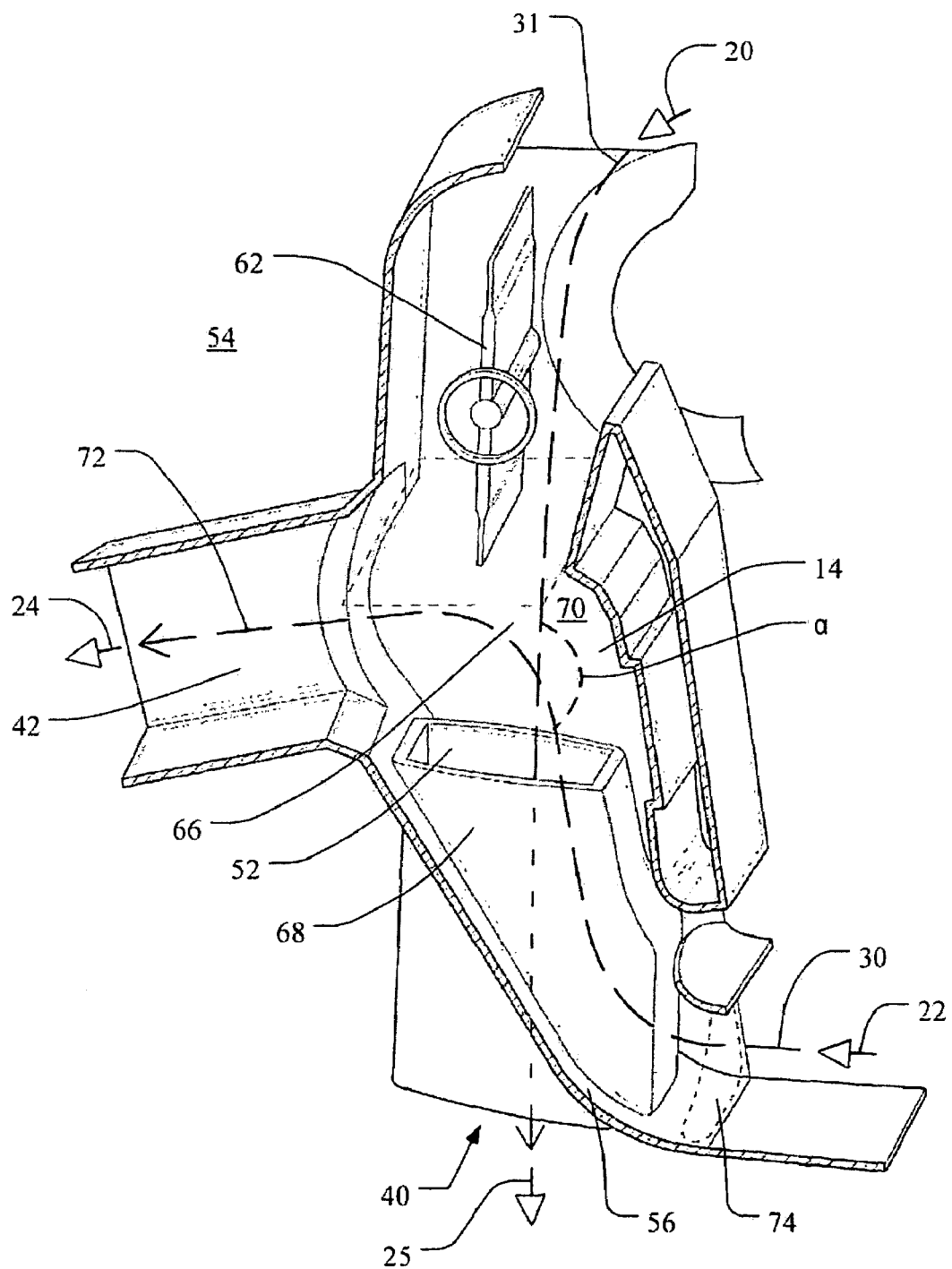
FIG. 3 is a perspective sectional illustration of the mixing chamber of the first multiple zone module.

FIG. 3 illustrates the fluid mechanical conditions within the second mixing chamber 14 of the air conditioning system, which is configured to be a "crossflow mixer". A second warm partial air flow 20 is supplied to the second mixing chamber 14 via a second flow path 31. This one enters the second mixing chamber from the top. The intensity of this second warm partial air flow 20 is regulated by means of a closing valve 62. Further, a second cool partial air flow 22 enters the second mixing chamber 14 through a laterally disposed entrance port that is disposed well beneath the entrance port for the second warm partial air flow 20. After the second warm partial air flow 20 has entered the second mixing chamber 14, it traverses a mixing zone 66 and is conducted toward a leg space outlet 40 for the rear zone. The second cool partial air flow 22, which has entered the second mixing chamber 14 in a horizontal flow direction, strikes an impingement baffle 56 and is redirected upward toward mixing zone 66 through said impingement baffle. Before reaching the mixing zone 66, it is thereby circulated around the leg space outlet 40 for the rear zone which projects into the second mixing chamber 14 in the form of a chimney 68. Said chimney 68 ends only upon reaching the mixing zone 66 located in the center of the second mixing chamber 14.

In accordance with the invention, a portion of the second warm partial airflow 20 supplied to the mixing chamber 14 is conducted out of the second mixing chamber 14 through chimney 68 after having traversed the mixing zone 66. The aperture cross section of the upper aperture of chimney 68, which is proximate to the mixing zone 66, is thereby smaller than the cross-sectional area of the entrance port 54 of the second warm partial air flow 20 into the second mixing chamber 14. In accordance with the invention, a fraction of the second warm partial air flow 20, which is substantially determined by the area ratios, enters the chimney 68. This fraction of the second warm partial air flow 20 is therefore caused to exit the second mixing chamber 14 immediately upon entrance into mixing zone 66 without having been mixed with the second cool partial air flow 22. Here no relevant blending with the second cool air flow 22 occurred so that the air-conditionable air flow 25 exiting the leg space outlet 40 for the rear zone was only cooled down to a certain extent as compared to the incoming second warm partial air flow 20.

That fraction of the second warm partial air flow 20 that has not been captured by the entrance port 52 of the chimney 68 is mixed with the second cool partial air flow 22 passing by the chimney 68 in the mixing zone 66. This results in a considerable cooling effect. For this reason, a substantially cooler second air-conditionable air flow 24 exits the laterally disposed rear panel outlet 42. It is evident that the flow path 70 of the warm partial air flow 20 extends almost in a straight line through the second mixing chamber 14. It can also be seen that the flow path 72 of the cool partial air flow 22 does not extend in a straight line through the second mixing chamber 14. After having entered the second mixing chamber 14, the horizontally incoming second cool partial air flow 22 strikes a sloped surface that is configured to be an impingement baffle 56. The impingement baffle 56 redirects the cool partial air flow 22 in the vertical direction so that, in the region of the mixing zone 66, it flows in a direction counter to the direction of the warm partial air flow 20. In the mixing zone 66, the flow paths 70 and 72 of the warm and of the cool partial air flow are inclined to one another at an angle $\alpha$ which, in the exemplary embodiment shown, is on the order of 135°. As already mentioned, such a counterflow pattern may have an advantageous effect, but it is not absolutely necessary for the "crossflow mixer" concept of the invention. More specifically, a flow pattern with an intersection angle of 90° and less, i.e., completely dispensing with counterflow, may also be advantageous. Those skilled in the art will recognize various possibilities to adapt the supply of the partial air flows to be mixed in the "crossflow mixer" to the construction conditions of the air conditioning system which is being designed.

In the exemplary embodiment shown the size of the mixing zone 66 in which the warm and cool partial air flows 20, 22 partially blend is substantially determined by the distance the chimney 68 projects into the center of the second mixing chamber 14. Accordingly, the temperature difference between the generated air flows 24 and 25 may be determined in particular by dimensioning the chimney 68 accordingly.

Figure 4:
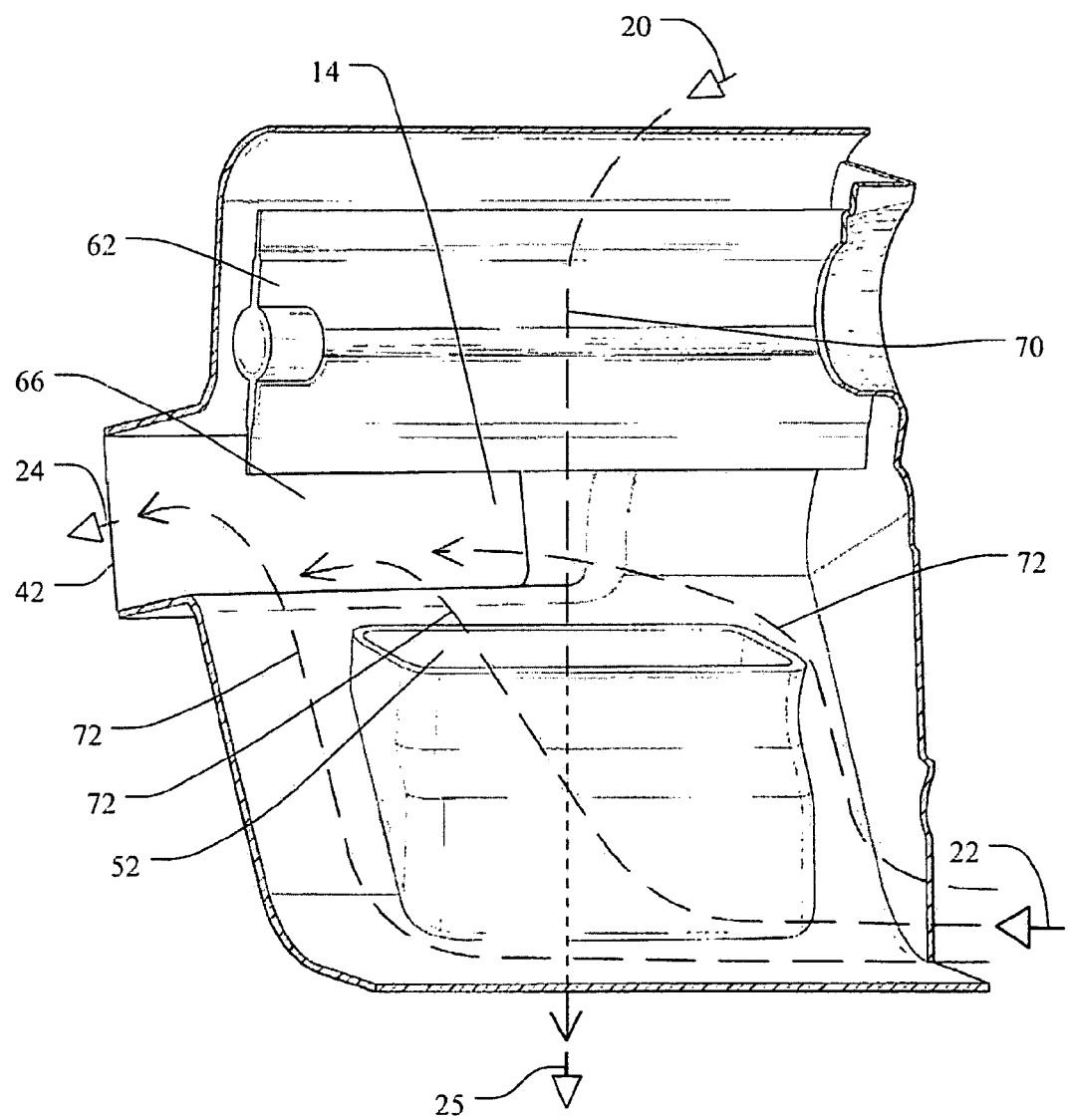
FIG. 4 is another perspective sectional view of the mixing chamber of the multiple zone module seen in FIG. 3.

FIG. 4 finally shows a partial perspective sectional view of the second mixing chamber 14 when viewed from the main air conditioning module 2 from the direction of the defrost outlet 42 for the rear zone. It can be readily seen that the chimney 68 is disposed in the center of the second mixing chamber 14 and that the second cool partial air flow 22 is passing by three sides thereof. The flow paths 72 laterally passing by the chimney 68 on the right and on the left side thereof lead a substantial portion of the incoming cool partial air flow 22 to the defrost outlet 42 for the rear zone. They thereby only slightly blend with those fractions of the warm partial air flow 22 that are not being received by the aperture cross section 52 of the chimney 68. By contrast, the fraction of the cool partial air flow 22 flowing along the flow path 72 running in the center is brought into intimate contact with the fraction of the warm partial air flow 22 that has been captured by the aperture cross section 52 of the chimney 68. It is thereby intimately blended with the latter and conducted to the leg space outlet 40 for the rear zone. From FIG. 4 it can be seen that the chimney 68 acts as a flow divider both for the second cool partial air flow 22 and for the second warm partial air flow 20.

To conclude it should be noted that, to practically realize a mixing chamber relying for operation on the "crossflow mixer" concept, it is readily possible to vary, more specifically also to interchange, the supply of warm and cool partial air flows to the mixing chamber with regard to the exemplary embodiment discussed since gravitational influences or a lift are practically negligible with the mixing chamber dimensions of the "crossflow mixer" in question.

FIG. 1a shows the various outlets for air-conditionable air flows formed on the air conditioning module 2. The main air conditioning module 2 is centrally symmetrically divided so that two separately controllable first mixing chambers 12a and 12b are obtained. One right and one left defrost outlet 42a, 42b, one right and one left front console outlet 44a, 44b and one right and one left front leg space outlet 46a, 46b are provided in said mixing chambers 12a and 12b which are provided for separately supplying the respective one of the right and the left front seats. Substantially equally conditioned "first air-conditionable air flows 8 ("first front right 8a" and "first front left 8b") exit the outlets 42a, 42b, 44a, 44b. Further substantially equally conditioned air-conditionable air flows ("second front right 9*a*" and "second front left 9*b*") the temperature of which is correlated with the "first air-conditionable air flows 8" exit the outlets 46*a*, 46*b*.

Additionally, further rear zone connecting outlets 76*a*, 76*b* that are disposed in the region of the two mixing chambers 12*a*, 12*b* may be provided on the base member 34 of the main air conditioning module 2. They permit to directly connect the supply lines for the rear zone (not shown) given individual adjustment is not desired in the rear zone (one- or two-zoned air conditioning system). If a three- or four-zoned air conditioning system is realized, these additional outlets 76*a*, 76*b* provided on the main air conditioning module 2 remain closed as shown in FIG. 1*a*.

FIG. 1*b* shows the various outlets for air-conditionable air flows that are formed on the multiple zone module 10'. By providing a centrally disposed parting plane, the single-zone multiple zone module 10' shown may be developed in a simple manner to achieve a two-zone multiple zone module (not shown) which forms two separately controllable second mixing chambers. A rear panel outlet 38 and a rear leg space outlet 40 for the rear zone are provided in the second mixing chamber 14. A second cooler air flow 24 adapted to be air-conditioned (independently of the first air-conditionable air flow 8) exits the outlet 38. Another warmer air-conditionable air flow 25 the temperature of which is correlated with the temperature of the second air-conditionable air flow 24 exits the outlet 40.

It should be further noted that all of the outlet associations described herein above for the air conditioning system 1 of the invention are given by way of example only. As a matter of course, it is also possible to freely supply to the various vent ports of the automotive vehicle the various differently air-conditioned air flows provided by the air conditioning system 1. More specifically, the temperature differences between the leg space outlets on the one side and the panel and defrost outlets on the other side have been indicated by way of example only and can be selectively adapted to the requirements of the automotive vehicle manufacturer.

The fluid mechanical active actuator elements such as the closing and mixing valves that have been illustrated herein may for example be mounted on shafts and actuated by means of current servomotors, more specifically by a stepper motor. The drive of these active actuator elements is preferably achieved by a central air-conditioning control unit that receives the commands of the user of the automotive vehicle and adjusts the actuator elements so as to carry into effect the user's inputs.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

The invention claimed is:

1. A multiple zoned air conditioning system for providing air conditioning to the interior of an automotive vehicle, said air conditioning system comprising:
    a fan to generate air flow;
    a main air conditioning module with a first heat exchanger for cooling and with a second heat exchanger for heating; and
    a multiple zone module;
    the main air conditioning module cooperating with the multiple zone module to create at least one first air flow adapted to be conditioned for temperature, said multiple zone module being interchangeably disposed with the main air conditioning module, when the multiple zone module is disposed on the main air conditioning module, the second heat exchanger engages the multiple zone module so as to allow air flow through the second heat exchanger, wherein when the multiple zone module is disposed on the main air conditioning module portions of the main air conditioning module and the multiple zone module cooperate and define:
        a first flow path within the main air conditioning module and
        a second flow path within the multiple zone module with the second heat exchanger extending into the first flow path and into the second flow path.

2. The multiple zoned air conditioning system for providing air conditioning to the interior of an automotive vehicle according to claim 1, wherein the multiple zone module is designed to create, in cooperation with the main air conditioning module, at least one second air flow adapted to be independently conditioned for temperature.

3. The multiple zoned air conditioning system for providing air conditioning to the interior of an automotive vehicle according to claim 2, wherein
    the main air conditioning module defines and forms a first mixing chamber for mixing first partial air flows conditioned for temperature in order to create the independently air-conditionable first air flow, with the first flow path leading to the first mixing chamber and
    the multiple zone module forms a second mixing chamber for mixing second partial air flows conditioned for temperature in order to create the independently air-conditionable second air flow, with the second flow path leading to the second mixing chamber.

4. The multiple zoned air conditioning system for providing air conditioning to the interior of an automotive vehicle according to claim 3, wherein the first mixing chamber is adapted to provided a first zone of the automotive vehicle with independently conditioned air and that the second mixing chamber is adapted to provide independently conditioned air to a rear zone of the automotive vehicle.

5. The multiple zoned air conditioning system for providing air conditioning to the interior of an automotive vehicle according to claim 3, wherein inlets into the first mixing chamber define a stable spatial stratification of the temperature within the first mixing chamber.

6. The multiple zoned air conditioning system for providing air conditioning to the interior of an automotive vehicle according to claim 3, wherein the first mixing chamber includes a panel outlet for an air-conditionable cooler first air flow and a leg space outlet for an air-conditionable warmer first air flow.

7. The multiple zoned air conditioning system for providing air conditioning to the interior of an automotive vehicle according to claim 1, wherein the first heat exchanger is a refrigerant circuit heat exchanger of the automotive vehicle.

8. The multiple zoned air conditioning system for providing air conditioning to the interior of an automotive vehicle according to claim 1, wherein the second heat exchanger is a coolant circuit heat exchanger of a drive unit of the automotive vehicle.

9. The multiple zoned air conditioning system for providing air conditioning to the interior of an automotive vehicle according to claim 1, further comprising an electrically operated heating element supported by the main air conditioning module, said heating element also extending into the multiple zone module so as to allow air to flow through said heating element when the multiple zone module is disposed on the main air conditioning module.

10. The multiple zoned air conditioning system for providing air conditioning to the interior of an automotive vehicle according to claim 3, wherein the second mixing chamber includes a panel outlet for an air-conditionable cooler second air flow and a leg space outlet for an air-conditionable warmer second air flow.

11. A multiple zoned air conditioning system for providing air conditioning to the interior of an automotive vehicle according to claim 1 further comprising a second multiple zone module, the second multiple zone module exhibiting air-conditioning properties that are different from those of the first multiple zone module.

12. The multiple zoned air conditioning system for providing air conditioning to the interior of an automotive vehicle according to claim 11, wherein the first multiple zone module provides at least one independently conditionable air flow for single conditioned air supply to a rear zone of the automotive vehicle; and the second multiple zone module defines at least two air flows adapted to be conditioned independently of one another for separate conditioned air supply to the left and to the right half of the rear zone of the automotive vehicle's rear zone.

* * * * *